Aug. 12, 1930.      W. H. JONES      1,773,003
GAUGE FOR MEASURING BUTTER
Filed Nov. 10, 1928
*Fig. 1.*
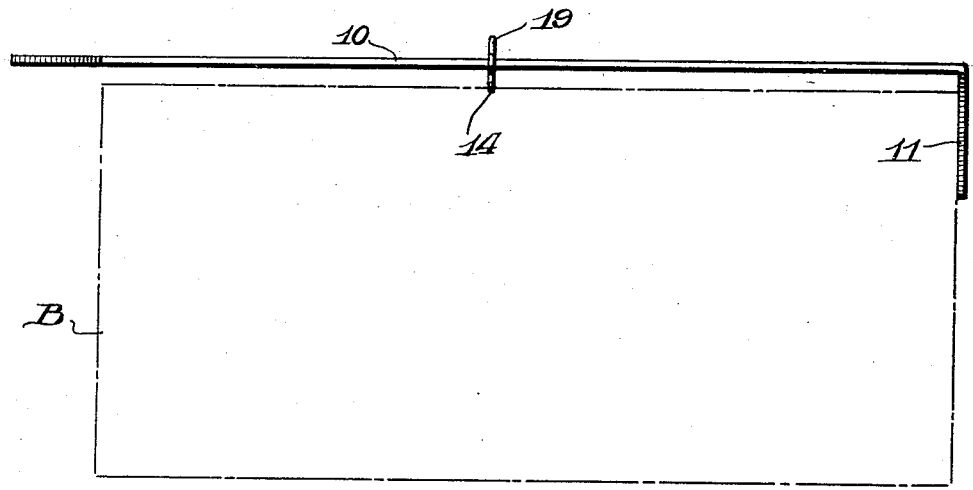
*Fig. 2.*
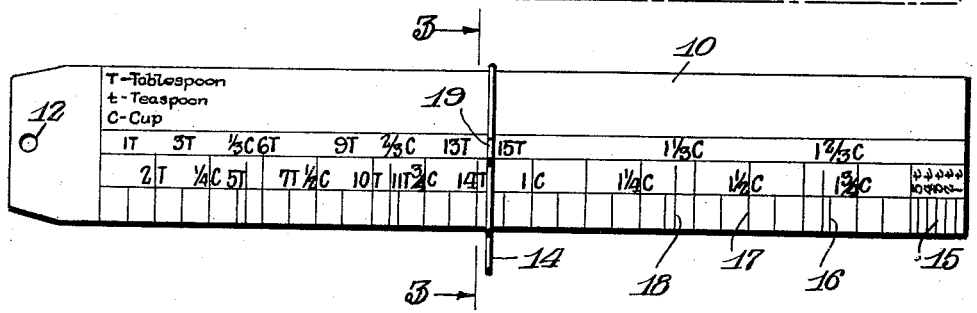
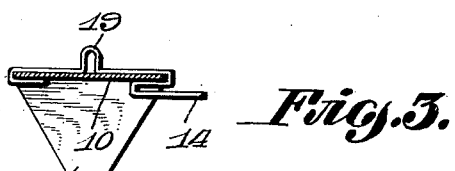
*Fig. 3.*
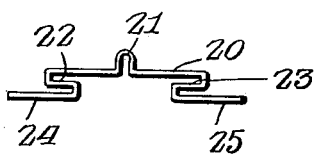
*Fig. 4.*
*William H. Jones,*
INVENTOR
BY *Victor J. Evans*
ATTORNEY Patented Aug. 12, 1930

1,773,003

UNITED STATES PATENT OFFICE

WILLIAM H. JONES, OF WALLA WALLA, WASHINGTON

GAUGE FOR MEASURING BUTTER

Application filed November 10, 1928. Serial No. 318,549.

The object of this invention is to provide for cutting from a print of butter of certain standard proportions and weight, a quantity sufficient to make one cup, a specified portion of a cup, or a given amount in excess of one cup.

A further object is to provide a graduated element which may be of plate form, and a combined pointer and marker, so that after this element has been set to the position required, the marker may be pressed in the surface portion of the print of butter, for indicating the line along which a cut is to be made in order to gradually measure the product by the cup full.

A further object is to enable an individual to ascertain the desired amount of butter when making a given article of food, without merely estimating the quantity and without the necessity of actually measuring by the use of a cup or the like.

With the foregoing and other objects in view, the invention consists in the novel construction and arrangement of elements described, illustrated and claimed, it being understood that modifications may be made within the scope of the claim without departing from the spirit of the invention.

In the drawings forming part of this application:

Figure 1 shows the gauge as applied to a surface portion of a print of butter, the gauge being in edge elevation.

Figure 2 is a plan view of the gauge.

Figure 3 is a section on line 3—3 of Figure 2.

Figure 4 is a detail view showing a slight modification of the slidable element.

The plate 10 is bent downwardly at one end to form a stop or the like, designated by 11, and adapted to engage one end of the print of butter B, as shown in Figure 1, the opposite end of the plate having an aperture 12 to permit of suspension from a hook or nail. Several series of graduations may be provided indicating tablespoon measurement, teaspoon measurement and measurement by the cup, and when the slidable device illustrated in the central portion of Figure 2 is set at a given point, it can be determined by the impression made on the surface of the print of butter, by marker 14, where the cut should be made when the quantity of butter to be used from a print of standard proportions is represented by a single unit of measurement of the character indicated, or a fraction of that unit, or the equivalent of the complete unit plus a fraction thereof.

The measurement by teaspoonful is shown at the extreme right of plate 10, at the point 15, the letter $t$ indicating a teaspoonful. Other series of graduations are designated 16, 17 and 18. A tablespoonful is indicated by T, and a cup by C.

The pointer and marker is set preparatory to the butter cutting operation by the use of handle 19 of Figure 3, and the impression is then made by marker 14 on the top or side of the print of butter.

Figure 3 shows that the main upper portion of the slidable device extends transversely of the plate 10, and is deflected under both edge portions of the plate, extension 14 being provided as the butter marker, any portion of the structure visible from the upper side serving as the indicating device or pointer, showing the user where to set the slidable element before proceeding further.

In the modification of Figure 4, the slidable device includes a main upper portion 20 formed with a handle or the like 21, the end portions of the wire or other material of which the device is formed being bent under at 22 and 23, and then being bent outwardly from opposite edge portions of the plate 10. The outwardly extending elements are designated 24 and 25, and they permit of sliding movement without binding action if engaged at the same time by the thumb and first finger of one hand, or manipulated otherwise in a suitable manner.

Having described the invention what is claimed is:

In a gauge, a plate member adapted to carry graduations thereon, and a combined handle, gauge pointer and butter marking device including an element extending transversely of the plate, deflected beneath the plate from opposite edge portions thereof, and projecting laterally beyond both of the edge portions.

In testimony whereof I affix my signature.

WILLIAM H. JONES.